RANSFORD B. WILSON
JOHN V. WILLIAMS
INVENTORS

ATTORNEY

United States Patent Office

3,503,741
Patented Mar. 31, 1970

3,503,741
SILVER-DYE-BLEACH PROCESS UTILIZING FORMAZAN DYES
Ransford B. Wilson and John V. Williams, Rochester, N.Y., assignors to Eastman Kodak Company, Rochester, N.Y., a corporation of New Jersey
Filed Nov. 4, 1966, Ser. No. 592,094
Int. Cl. G03c 5/52
U.S. Cl. 96—20                          13 Claims

ABSTRACT OF THE DISCLOSURE

Formazan dyes, chelated formazan dyes and certain colorless formazan dye formers are useful as image-forming constituents in photographic elements designed to produce colored dye images by the silver-dye-bleach process since they provide such elements with improved spectral properties and thereby promote the formation of improved colored dye images by means of the silver-dye-bleach process.

This invention relates to color photography and more particularly to novel photographic silver-dye-bleach materials and processes.

The production of multicolor images by the so-called silver-dye-bleach process is based on the use of a material consisting of a plurality of superposed silver halide emulsion layers, each of which contains a bleachable azo dye of a color complementary to the color of that portion of the spectrum to which the respective silver halide layer is sensitive. The material is exposed, developed and subsequently treated in a bleach bath wherein the dyes are rendered colorless in proportion to the metallic silver produced during development. After removal of the residual silver and silver halide by silver bleach, fixing, and washing, a positive dye image is obtained. A common silver-dye-bleach process as described above suffers from the disadvantage that the azo dyes incorporated in the light-sensitive silver halide emulsion layers absorb a sufficient amount of the exposing light to substantially reduce the effective speed of the film material.

Various methods have been employed to overcome this disadvantage. One such method has consisted of placing the dyes in separate coating layers below the silver halide layers. While such a transposition of the dyes has improved the effective speed of the film somewhat, it has also led to unsharp images due to the increased thickness of the film which has brought about a scattering of the exposing light and created a longer diffusion path along which the dye bleach catalyst has to travel from the silver to the dye. Other attempts to overcome the above described shortcoming, such as false sensitization or dyeing of the film after exposure, have been equally unsatisfactory. The replacement of the preformed azo dye by various forms of colorless precursors of the dyes, such as, for example, nitroso compounds or azo couplers, has also proven to be of only limited advantage inasmuch as the conversion of the precursors to their respective dyes requires at least one additional processing step. A fourth known method of enhancing the speed of conventional silver-azo-dye-bleach materials has been that of incorporating into the material special azo dyes which can exist in differently colored forms, depending on the pH of the surrounding medium. During the exposure, such pH-sensitive dyes are of a color suitable to transmit light of those wavelengths to which the layers containing the dyes, or the layers lying beneath them, are sensitive. Again, such a method is undesirable because an additional pH-changing treating bath is required in order to shift the hue of the dyes to that which is desirable in the finished image, and because these special dyes have poor stability upon prolonged keeping.

Another difficulty which has been encountered with azo dyes is the limited choice of dyes, particularly cyan-colored dyes, with respect to their spectral absorption characteristics and in regard to their remaining stable during prolonged storage of the photographic prints containing the dyes. Thus, many of the azo dyes which could be employed in silver-dye-bleach materials from the standpoint of bleachability and of compatibility with silver halide emulsions have to be rejected because of inadequate stability and because they have unsuitably broad absorption bands and/or their absorption does not lie in the proper wavelength region.

There is, therefore, a need for improved photographic silver-dye-bleach materials and processes wherein the image-forming dyes do not inhibit the effective speed of the silver halide emulsion layers during exposure; wherein the finally obtained dye images are of good stability to light and under adverse atmospheric conditions; and wherein the image-forming dyes, and particularly the image-forming dyes associated with the green- and red-sensitive emulsion layers, have improved spectral properties.

It is an object of this invention to provide such improved photographic silver-dye-bleach materials and processes.

It is another object to provide novel photographic silver-dye-bleach materials having improved light-sensitivity, stability, and spectral absorption.

It is a further object of our invention to provide such materials which can be processed by conventional azo-dye-bleach methods without the need for additional processing steps.

These and other objects of this invention are accomplished by silver dye bleach processes which result in the formation of a formazan dye image. The photographic elements used in carrying out this process may contain formazan dye, chelated formazan dye, or colorless tetrazolium salts (also referred to herein as formazan dye formers) which form, during processing, suitable formazan dye. The invention includes processes for preparing monochrome formazan dye images and multicolor formazan dye images. In accordance with the invention, formazan dye images are formed which are the reverse of the metallic silver image. Preferably, the formazan compounds used herein are non-diffusible in hydrophilic colloids.

In a preferred embodiment of the invention, formazan dye is uniformly generated in a photographic element containing an exposed light-sensitive silver halide emulsion layer which has in association therewith colorless tetrazolium salt, by elevating the pH of the element in the presence of a mild reducing agent which may be the photographic developer or an auxiliary reducing agent; metallic silver image is developed within the layer using silver halide developing agent; and, formazan dye is bleached imagewise in just the areas of the metallic silver image. Preferably, the image in the completed photographic element is composed solely of formazan dye (or chelated formazan dye).

According to another embodiment of our invention, at least one of the image-forming dyes can be incorporated in the silver-dye-bleach materials in the form of the dye's colorless tetrazolium salt precursor, which precursor is non-electively reduced to its corresponding formazan dye by elevating the pH of the element, e.g., during the black-and-white development.

According to another embodiment of this invention, at least one of the formazan dyes used in the silver-dye-bleach materials of our invention is stabilized and changed in color by chelation with a suitable metal compound. Such chelation of a formazan dye can be carried out either before the dye is incorporated into the silver-dye-bleach element or during the processing of the element.

In still another embodiment of this invention, a process is provided for obtaining multicolor images in an exposed photographic element including a support having coated thereon at least three separate overlying hydrophilic colloid layers sensitized to red, green and blue radiation, said layers having in association therewith, respectively, formazan compound (e.g., formazan dye or tetrazolium salt) which provides, respectively, cyan, magenta and yellow color. These cyan, magenta and yellow colors can be provided by using formazan dyes of such colors, tetrazolium salts which yield formazan dyes of such colors, chelated formazan dyes, or formazan dyes which provide such colors upon chelation. The first step of the process involves contacting the element with silver halide developing agent to develop metallic silver image in at least one of the layers. The pH of the element is raised, usually to a sufficiently high level during silver halide development, to generate formazan dye uniformly throughout the layers in which formazan-dye-former is used. The next step involves bleaching to destroy imagewise the formazan dye in association with any layer in which silver image was formed. Then, the metallic silver and silver halide are removed from the element. A chelation step may be used to obtain proper color or enhance stability of the formazan image.

Tetrazolium salts within the scope of our invention include those having general Formula I, and which can be reversibly converted to formazan dyes of general Formula II as follows.

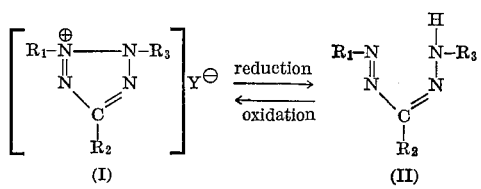

In the above Formulae I and II, $Y^\ominus$ represents an anion; $R_1$, $R_2$ and $R_3$ each represents an aryl or a heterocyclic substituent (preferably containing from 5 to 6 atoms, preferred hetero atoms being N, S, O and Se), such as, for example, phenyl, substituted phenyl, naphthyl, substituted naphthyl, a substituted or unsubstituted thiazolyl, benzothiazolyl, oxazole, benzoxazole, selenazole or benzoselenazole radical; $R_2$, in addition, can represent an alkyl group (e.g., methyl, butyl, hexyl, dodecyl, etc.) or a substituent (including acidic substituents) such as, for example, —H, —OH, —COOH, —SO$_3$H, —SH, —NO$_2$, etc., or any other substituent cited as being present in this position of the formazan or the tetrazolium salt in Chem. Rev., 55, 355–483 (1955); and the substituents $R_1$ and $R_3$ may contain an electron-sharing group capable of forming metal chelates or complexes. Examples of such chelating groups or complexes are primary, secondary and tertiary amino, imino, substituted imino, oxime, thioether, keto, thioketo, hydroxyl, mercapto, carboxyl, sulfo, and phospho, alkoxy groups or complexes.

The formazan dyes and tetrazolium salt precursors useful in our invention also include bis-compounds of the general Formulae III and IV (III)

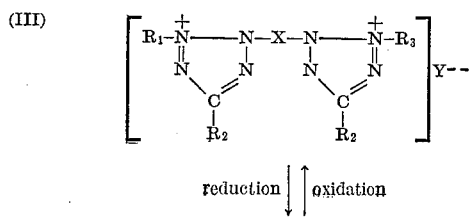

(IV)

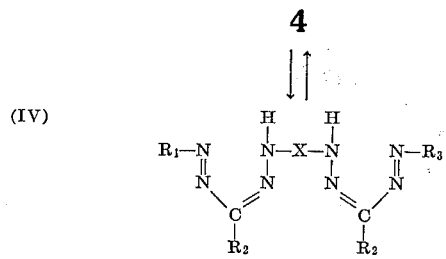

wherein $Y^{--}$ represents an aion and X an alkylene or arylene group; and $R_1$, $R_2$, and $R_3$ each represents a substituent as described above in connection with Formulae I and II.

Specific examples of tetrazolium salts or formazan dyes which are useful in carrying out this invention are:

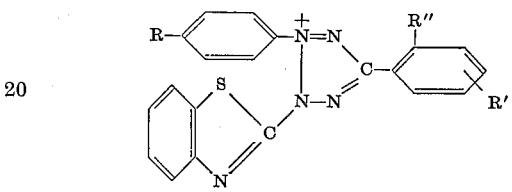

| | R | R' | R'' |
|---|---|---|---|
| Compound No.: | | | |
| 1 | —NO$_2$ | —H | —H |
| 2 | —NO$_2$ | 4-OCH$_3$ | —H |
| 3 | —H | —H | —H |
| 4 | —OCH$_3$ | —H | —H |
| 5 | —CH$_3$ | —H | —H |
| 6 | —NO$_2$ | 4-CH$_3$ | —H |
| 7 | —Cl | —H | —H |
| 8 | —NO$_2$ | 4-Cl | —H |
| 9 | —NO$_2$ | 4-NO$_2$ | —H |
| 10 | —NO$_2$ | —H | —Cl |
| 11 | —H | —H | —Cl |
| 12 | —NO$_2$ | —H | —OCH$_3$ |
| 13 | —NO$_2$ | —H | —CH$_3$ |
| 14 | —NO$_2$ | 4-CH=CHC$_6$H$_5$ | —H |
| 15 | —NO$_2$ | 3-NO$_2$ | —H |
| 16 | —NO$_2$ | 3-OCH$_3$ | —H |

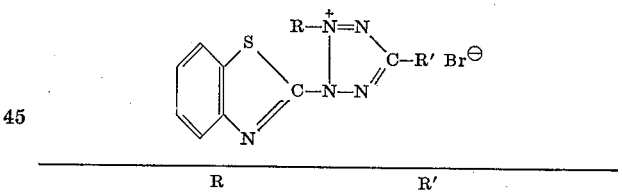

| | R | R' |
|---|---|---|
| Compound No.: | | |
| 17 | NO$_2$—⌬—SO$_3^\ominus$ | —⌬—OC$_6$H$_{13}$ |
| 18 | —⌬—SO$_3^\ominus$ | —⌬—OC$_6$H$_{13}$ |
| 19 | SO$_3$K-naphthyl-SO$_3^\ominus$ | —⌬—OC$_6$H$_{13}$ |

Compound No.:

20.

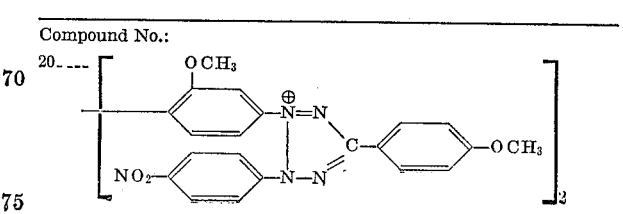

Compound No.:

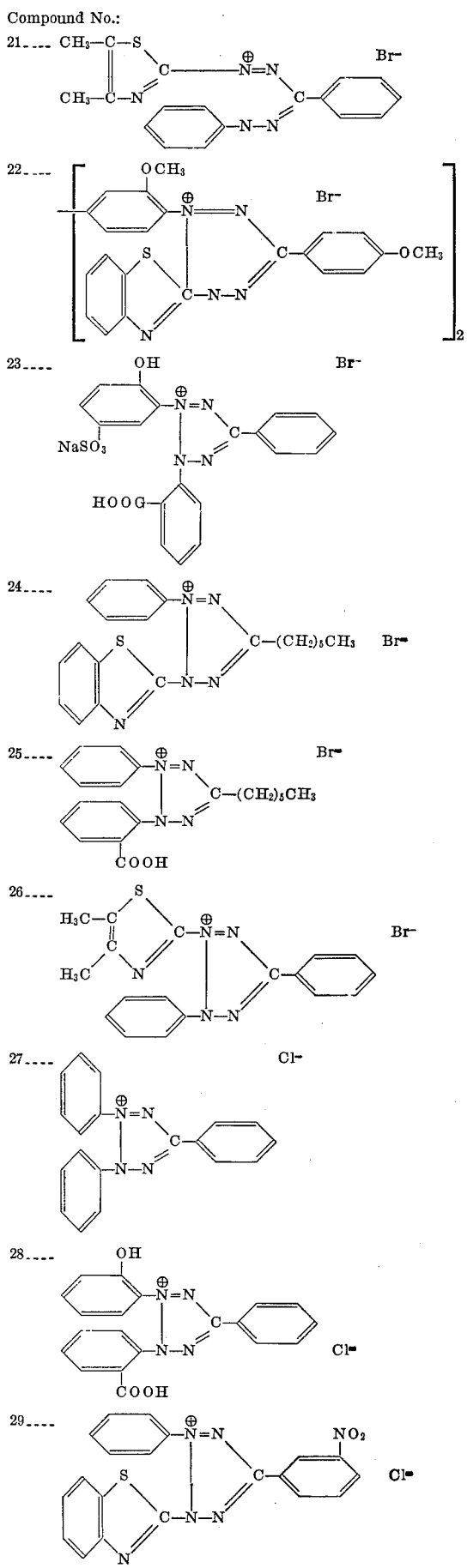

Compound No.:

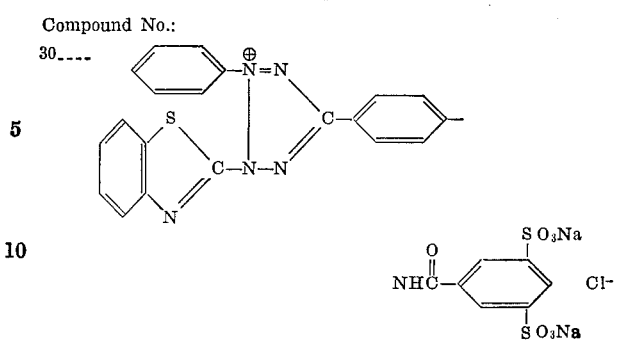

It is known in the art to convert tetrazolium salts to their respective formazan dyes. Tetrazolium salts contained in a photographic silver halide layer have been reduced to formazans in situ with a previously developed silver image. This type of generation of formazan dyes in a photographic element differs from ours not only in that it requires the separate treatment of the film in an additional processing solution, but also in that is produces the dyes in situ with the metallic silver image, whereby there is finally obtained a negative, rather than a positive, reproduction.

It is also known in the art to decolorize formazan dyes in filter layers. The conversion of the formazan dyes to colorless products in filter layers occurs non-imagewise, i.e., irrespective of reduced or non-reduced silver halide. Hence by this method it is neither intended nor possible to produce photographic dye images. It is also known to discolor a preformed yellow formazan dye in coupler-containing color photographic silver halide emulsion layers for the purpose of correcting the unwanted absorption to blue light of the color developed magenta or cyan dyes. In this procedure, reaction products of the color developers of the p-phenylenediamine type render the yellow formazan dye colorless in proportion to the metallic silver generated during the color development cycle. This method differs from ours in that the dye is reversibly oxidized to its corresponding tetrazolium salt, rather than irreversibly destroyed by reduction, in proportion to the developed silver image, and in that the formazan dye serves as a color-correcting image in addition to the main images produced by the coupler development technique.

The invention will be further illustrated by the accompanying drawings.

Figure 1:
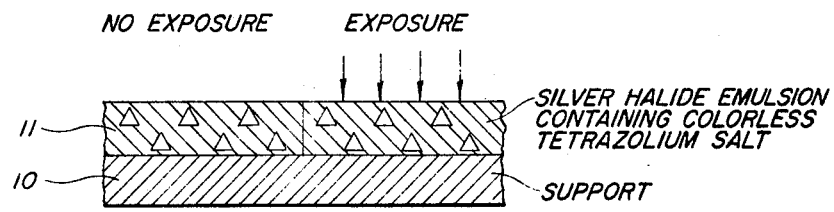
FIGURE 1 is a schematic diagram of a system utilizing the present invention in an exemplified monochrome silver-dye-bleach process.
Figure 1:
Figure 1:
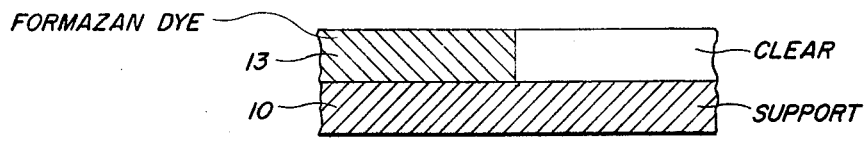

Referring now to FIGURE 1, it is seen how the invention is accomplished in, for example, a monochrome system. A light-sensitive silver halide emulsion layer 11 containing a tetrazolium salt is coated on a support 10 and exposed to an original image as shown in Stage 1. Exposed layer 11 is then developed in a common black-and-white developing solution to produce a silver image, as shown in Stage 2, layer 12. During the development the so-far colorless tetrazolium salt is reduced to yield the formazan dye uniformly throughout the emulsion layer, also shown in Stage 2, layer 12. Next, the unreduced silver halide in areas of the film not struck by light is rendered soluble in a conventional fixing bath and subsequently removed from the film by washing. The film is then placed in a dye-bleach bath in which the formazan dye is destroyed in the areas of the developed silver image. Finally, the film is silver bleached, fixed and washed, in order to remove any residual silver and silver salt. The product obtained, shown in Stage 3, features layer 13 which contains a positive reproduction, in color, of the original image. The formazan dye may be chelated, if desired. For example, a magenta formazan dye image in layer 13 may be chelated to convert the color of the dye to cyan.

Figure 2:
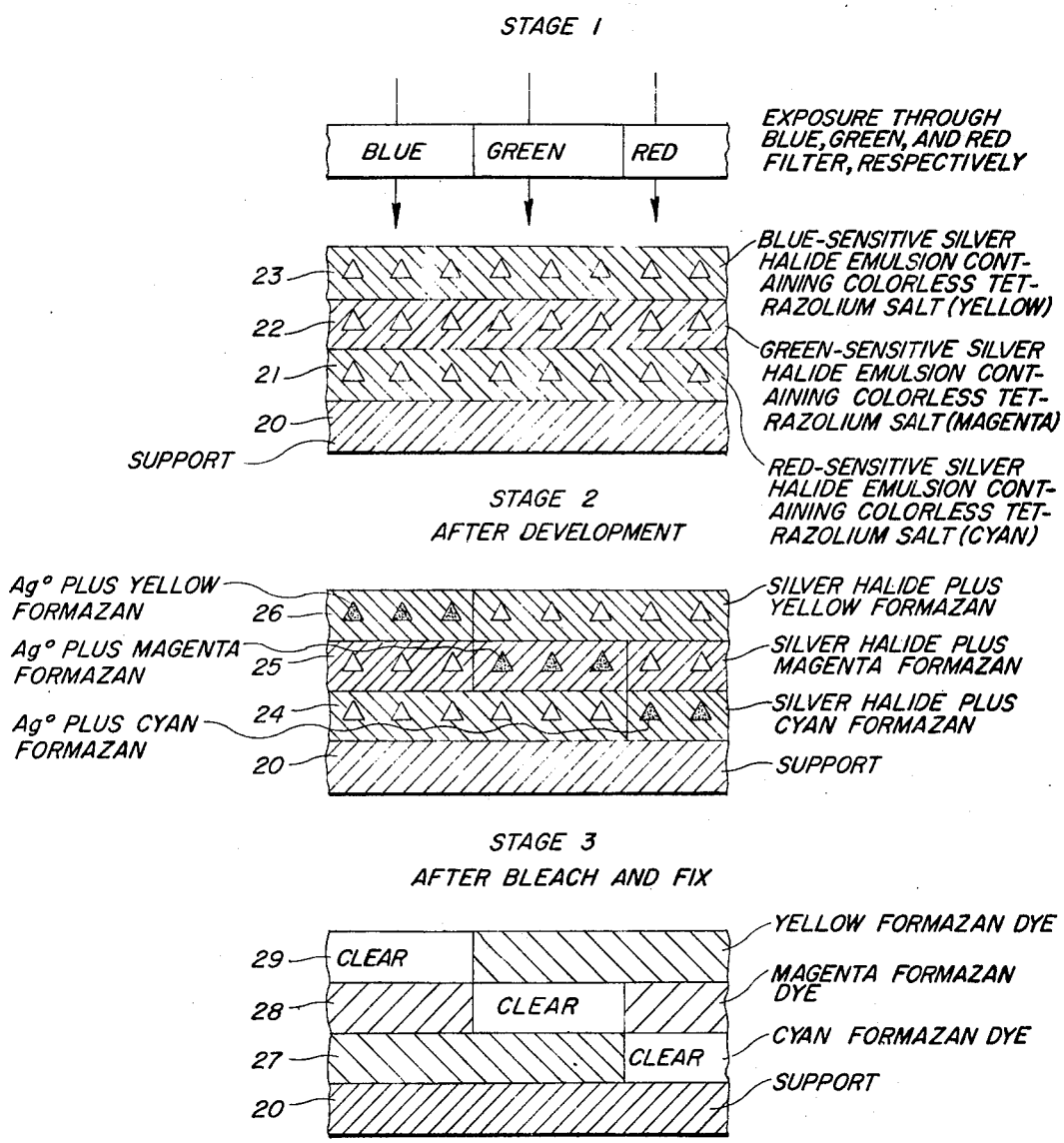
FIGURE 2 is a schematic diagram showing a system utilizing the present invention in a three-color silver-dye-bleach process.

FIGURE 2 shows a system utilizing the present invention in a three-color silver-dye-bleach process. The multilayer film is, for example, prepared by forming on a support 20 a multilayer coating having a silver halide emulsion layer 21 sensitive to red light, a silver halide emulsion layer 22 sensitive to green light, and a silver halide emulsion layer 23 sensitive to blue light. Layer 23 contains a tetrazolium salt capable of forming a bleachable yellow dye, layer 22 contains a tetrazolium salt capable of forming bleachable magenta dye, and layer 21 contains a tetrazolium salt which forms bleachable cyan dye. The photographic element thus formed is then imagewise exposed as shown in Stage 1. The exposed element is then developed, as shown in Stage 2, thereby providing metallic silver images in layers 24, 25 and 26. During development, the colorless tetrazolium salt is converted to cyan, magenta and yellow dyes in layers 24, 25 and 26, respectively. Then, as shown in Stage 3, undeveloped silver halide is removed from the element, formazan dye is bleached imagewise in areas of metallic silver image, and metallic silver is removed. Yellow, magenta and cyan formazan dye images are obtained, respectively, in layers 29, 28 and 27. A positive, three-color reproduction of the original scene is thereby obtained.

The tetrazolium salts and formazan dyes employed in this invention can be prepared by conventional methods such as those described in Chem. Rev., 55, 355–483 (1955), J. Org. Chem., 25, 575–578 (1960), and in Chem. Berichte, 87, 1505 (1954). Typical syntheses which are generally applicable to the preparation of these compounds follow.

SYNTHESIS OF 1,3-DIARYL-5-(α-BENZ-THIAZOLYL)FORMAZANS

A suspension of 0.1 mole of an aromatic amine in 21 ml. of concentrated hydrochloric acid and 25 ml. of water is diazotized at 0 to 5° C. with 8.9 g. (0.13 mole) of sodium nitrite dissolved in 20 ml. of water. The resulting diazonium solution is added all at once to a well stirred solution of 0.1 mole of arylaldehyde 2-benzthiazolylhydrazone in 1 liter of tetrahydrofuran at acetone-dry ice temperature. Immediately thereafter there are added, in susccessive small portions, 120 ml. of 20% aqueous potassium hydroxide. During the addition, the mixture becomes deep blue in color. After stirring for 1 hour, the mixture is allowed to attain room temperature, one liter of water is added, and stirring is continued for another hour. The black precipitate is filtered and washed with hot water until the washings become clear. The pure product is obtained by recrystallization from a mixture of tetrahydrofuran and water.

SYNTHESIS OF 2,5-DIARYL-3-(2-BENZ-THIAZOLYL TETRAZOLIUM BROMIDE

To a hot solution of 0.02 mole of 1,3-diaryl-5-(2-benzthiazolyl)formazan in 1 liter of ethyl acetate is added, with stirring, a solution of 0.03 mole of N-bromosuccinimide dissolved in 250 ml. of ethyl acetate. The mixture is stirred at room temperature for 1 hour, during which time a yellow precipitate forms which is collected and washed in succession with ethyl acetate, cold tetrahydrofuran, and ether. Purification is achieved by dissolving the tetrazolium bromide in methanol and reprecipitating it with ether.

The tetrazolium salts and formazan dyes can be used in the silver-dye-bleach materials of our invention at concentrations ranging from about 15 mg./ft.$^2$ to about 100 mg./ft.$^2$ at a silver coverage of about 100 mg./ft.$^2$, and preferably at a concentration range of from about 20 to 80 mg./ft.$^2$ at a silver coverage of about 100 mg./ft.$^2$.

As has been mentioned, one aspect of this invention relates to the chelation of formazan image dyes for the purpose of improving the dyes' stability and/or to bathochromically shift the dyes' spectral absorption bands. This aspect of our novel process of converting in a silver-dye-bleach element a formazan dye of a first color to a formazan dye of a second color may be described as follows: A gelatin-silver halide emulsion layer sensitive to red light and containing a colorless tetrazolium salt is exposed and black-and-white developed. During development the tetrazolium salt is converted to its magenta-colored formazan dye uniformly throughout the emulsion. The emulsion is now magenta-colored and carries a visible negative silver image. It is then treated in a bleach-fix bath wherein the dye is rendered colorless in proportion to the reduced silver and wherein the reduced silver and the silver halide are respectively bleached and fixed so as to be removable from the emulsion by a subsequent water wash. The resulting positive magenta-colored formazan dye image is then changed to a positive cyan-colored formazan dye image by bathing the film in a solution containing a suitable metal salt or complex which chelates the dye to give it the proper hue and improved stability. Alternatively, the dye can be chelated before the bleach-fix step or during such a step by, for example, incorporating the chelating agent directly into the bleach-fix solution. It is, of course, not necessary that the formazan dye which is chelated be generated from its corresponding tetrazolium salt during the processing of the silver-dye-bleach material. Thus, the magenta-colored formazan dye may be incorporated in the red-sensitive silver halide emulsion during the preparation of the emulsion, i.e., before coating.

Dyes of the class described above may be used either alone or in combination of two or more. They may also be used in combination with other dyes to form combined colors, including neutral. Further, they may be used in combination with other addenda, such as antistain agents, stabilizers, spectral sensitizing dyes, absorbing dyes, brightening agents, ultraviolet absorbers, etc.

The formazan dyes may be incorporated in each of the silver halide emulsion layers in the form of their respective colorless tetrazolium salt procursors. Thus, the blue-sensitive emulsion layer may contain a tetrazolium salt which is converted to its corresponding yellow-colored formazan, and the green- and red-sensitive layers each may contain a tetrazolium salt which is converted to magenta and cyan, respectively. Alternatively, only one or two of the emulsion layers may contain the precursor, while the remaining layer or layers may have incorporated therein the dye in its performed state. One of the latter arrangements would, for example, provide an element wherein the green-sensitive emulsion layer contains a colorless magenta-dye-yielding precursor and the blue- and red-sensitive layers, respectively, contain a yellow- and cyan-colored formazan dye. The formazan dyes or their precursors may also be incorporated in the photosensitive material by dispersing them in light-insensitive layers beneath the corresponding silver halide emulsion layers.

In order to prevent the dyes an precursors from migrating within or out of the film-forming layers containing them, they can be introduced by any one of several known techniques. Thus, the precursors or the formazan dyes may be dissolved in a water-immiscible oil and dispersed in the form of fine droplets in the colloid medium, or, if they include in their molecule a group or groups known to impart nondiffusiblity, such as long-chain alkyl or other ballasting groups, the compounds may be added directly to the film-forming material. In the latter instance, it is preferred that the precursor or dye also contains a solubilizing group, e.g., a sulfonic acid or carboxylic acid group. Diffusion of the tetrazolium salts or the formazan dyes may also be inhibited by incorporating in the film-forming layers a ballasted mordant having acidic substituents. Useful mordanting compounds, such as 5 - [4-(2,4-di-t-amplphenoxy) - 3 - (phenylcarbamyl)

phenylcarbamyl]-1,3-benzenedisulfonic acid dipotassium salt, are disclosed in U.S. Patent 2,756,149.

The class of formazan dyes featured in our invention bleach very rapidly and completely in the presence of metallic silver. This advantage is very important, especially in processes which require a minimum of time, such as, for example, in the one-step silver-dye-bleach process described in Michel and Reitter U.S. Ser. No. 512,907, filed Dec. 10, 1965. According to that application, exposed silver-dye-bleach elements which contain the salt of an acid are processed by developing the element in contact with a web which contains free acid substituents that convert the acid salt in the element to its free acid form. Thus, the pH of the layer is reduced and dye is bleached imagewise in the presence of silver complexing agent in areas of the metallic silver image. The silver complexing agent may be present in the web.

The light-sensitive emulsions employed in the elements and processes of this invention can comprise any of the useful silver halide light-sensitive salts, such as silver chloride, silver bromide, silver iodide, and mixed halide salts, such as silver chlorobromide, silver chlorobromoiodide, etc. The emulsions may be conventional surface sensitive emulsions, direct positive emulsions, or internally sensitive emulsions. If desired, each image-forming layer may consist of two emulsions having different speeds and it may be double-coated to provide a wider latitude for the element.

It is desirable to provide between each emulsion layer of our silver-dye-bleach elements a hydrophilic colloid interlayer which may contain various addenda such as ballasted quinones (i.e., to prevent interlayer diffusion of reduced dye-bleach catalyst), removable filter dyes, etc.

A wide variety of hydrophilic colloids (or alkali permeable binders) may be used in preparing the silver halide emulsions, such as gelatin, polyvinyl alcohol, water-soluble cellulose derivatives, and other binders of the type referred to in Col. 13 of U.S. Patent 3,039,873. The emulsions may contain chemical sensitizers, spectral sensitizers, speed increasing compounds, gelatin plasticizers, and hardeners, examples of which are referred to in Cols. 10–12 of U.S. Patent 3,039,873.

The elements of our invention may be made in the form of a single layer coating for monochrome dye images formed from either one or a mixture of dyes, which dye images may be either colored or neutral, or may have a plurality of layers each containing a different bleachable dye for providing multicolor images. Especially useful arrangements are those in which at least three light-sensitive emulsion layers are provided which are respectively sensitized to blue, green and red radiation and contain, respectively, nondiffusible yellow, magenta and cyan dyes or the colorless tetrazolium salt precursors thereof. While the dye precursors and/or bleachable dyes are preferably incorporated in their respective light-sensitive silver halide emulsion layers, it is also possible, and sometimes preferable, to incorporate any or all of them in an alkali permeable layer or layers contiguous to the emulsion layer or layers. Thus, one useful arrangement would be one which has a support coated, in the following order, with separate hydrophilic colloid layers containing, respectively, blue-sensitive silver halide; bleachable yellow dye or dye precursor; green-sensitive silver halide; bleachable magenta dye or dye precursor; red-sensitive silver halide; and a bleachable cyan dye or dye precursor. Such an element would preferably be exposed through the support. As used herein and in the appended claims, the reference to a bleachable dye or its precursor being "in association with" a particular layer means that the bleachable dye or the precursor is incorporated in that layer or in an alkali permeable layer contiguous to such a layer.

The dyes which are particularly suited to the silver-dye-bleach process according to our invention have excellent reactivity in the bleaching operation and are compatible with other components of the light-sensitive system.

Metal chelates of azo dyes for use in the azo-bleach process have been previously described, for example, in U.S. Patents 2,304,884; 3,081,167; 2,055,407; German Patent 1,166,621; French Patent 1,358,695; and British Patents 899,758; 930,479; 931,647; and 939,009. Metal chelates of formazan dyes for use as textile dyes and as therapeutic agents, etc., have also been previously described, for example, in Swiss Patent 246,475; and in British Patents 758,662 and 944,909. However, no prior reference to the use of metal chelates of formazans as bleachable image dyes in silver-dye-bleach processes is known.

The dye chelates useful in our invention are of a heterocyclic structure representing the combination of a metallic atom with one or more formazan dye molecules which is capable of forming two or more coordinating covalent bonds with the metal atom. The improved chelated formazan image dyes of this invention can be prepared by treating the film-forming layer containing the dye with a suitable metal derivative. Typical metals include cesium, magnesium, aluminum and the transition elements of the Periodic Table of Elements having atomic weights from about 50 to about 201. Examples of such useful transition elements are chromium, manganese, iron, cobalt, nickel, copper, zinc, rhodium, cadmium, mercury, etc.

Among the metallic derivatives which may be used to advantage are metal salts of acids, such as nitrates, thiocyanates, sulfates, chlorides, formates, acetates, and the like. Also useful are complexes of hydroxycarboxylic acids, such as lactic, tartaric, citric, and salicyclic acid, all of which contain the desired metal in the form of the cation of the acid. Still other compounds which are useful as chelating agents include metal complexes with nitrogen compounds, e.g., ammonia and lower aliphatic amines such as methyl- and ethylamine, triethanolamine, pyridine, and aminocarboxylic acids such as glycine. Although the chelation of the dyes can be performed before the dyes' incorporation in the photographic element, it is preferred to do so after their incorporation, i.e., during the processing of the exposed silver-dye-bleach element. The dyes' chelation takes place most advantageously in either the alkaline medium of the black-and-white developer solution or in the bleach or fix bath. The chelation may also be accomplished in a separate aqueous solution containing the chelating agent.

Development of the exposed photographic emulsion is effected, in the presence of a silver halide developer, by elevating the pH of the emulsion with an alkaline processing solution. Advantageously, the pH of the solution is raised to about 8 or above. A wide variety of alkaline solutions can be employed, such as sodium or potassium hydroxide. Development rate controllers such as potassium bromide may be used. Other agents found in conventional developers, antifoggants and stabilizers may be included in the alkaline processing solutions.

Conventional photographic developers are operable in the invention. These developers may be incorporated in emulsions in accordance with prior art procedures or may be added to the alkaline developing solution. In certain instances, it is possible to incorporate in the emulsion one molecule which contains both the developing function and the bleachable dye function (which may be a formazan dye of the type described above). Such molecules are nondiffusible, and the dye portion of the molecule must be bleachable.

The light-sensitive elements of our invention may be used to record images using visible radiation or other radiation such as X-rays, ultraviolet, infrared, etc.

The light-sensitive emulsions employed in the process and elements of this invention may be coated on a wide variety of supports, including film bases such as polyethylene terephthalate, cellulose acetate butyrate, polycarbonate, polyolefins (e.g., polyethylene and polypropylene)

and the like. When such film bases are used, the photographic product obtained may be used, for example, as a transparency. If desired, the emulsions may be coated on an opaque support such as paper, polyolefin-coated paper, such as polyethylene or polypropylene coated paper, which may be pigmented with $TiO_2$, for example, and electron bombared to promote emulsion adhesion. When such supports are used, a color photographic print may be obtained. When the emulsions coated on such supports are exposed to an original, a suitable optical system may be used to laterally reverse the image to have a right-reading print.

Advantageously, the bleaching of the image dye is conducted in the presence of any suitable catalyst, such as a phenazine, a quinoxaline or an anthraquinone. A number of catalysts useful herein are described in U.S. Patent 2,183,395 and 2,270,118. In accordance with this invention, the catalyst may be incorporated in the emulsion, the alkaline processing material, the acidic processing web, in the acid dye-bleach bath, or in more than one, or in all of these elements. These compounds oxidize the metallic silver to silver ion, and, in so doing, are reduced. The reduced catalyst then cross-oxidizes with the image dye. This cross-oxidation decolorizes (i.e., bleaches) the image dye and oxidizes the catalyst back to its original state.

Compounds which are useful in oxidizing excess metallic silver to silver ion and which do not interact in their reduced form with the bleachable image dyes are known as silver bleaching agents; typical examples of which ore o- and m-nitrobenzene sulfonic acids, diffusible azo dyes, etc. Other typical silver bleaching agents are disclosed in British Patent 533,190. These agents may be incorporated in the emulsion, the alkaline processing material, the acidic processing web, an acid bleach bath, or in more than one, or in all, of these elements.

The following examples are intended to illustrate but not to limit our invention.

Example 1

Two hundred fifty mg. of Compound 27 were dissolved in 30 ml. of water and admixed with stirring at a temperature of 40° C. to 30 ml. of an orthochromatically sensitized silver bromoiodide (6 mole percent iodide) emulsion containing 108 g. of silver and 540 g. of gelatin per 39.0 kg. of the emulsion. The preparation was coated on a cellulose acetate film support at the approximate coverages of 80 mg./ft.$^2$ of silver; 400 mg./ft.$^2$ of gelatin; and 18.5 mg./ft.$^2$ of Compound 27. After drying, a sample of the coating was sensitometrically exposed through a 0.3 log E neutral density step tablet for 1 second at a distance of 18″ with a No. 212 photoenlarger lamp and processed as indicated below.

Step 1.—Development for 2 minutes at a temperature of 75° F. in a solution of the following composition:

| | G. |
|---|---|
| Ascorbic acid | 50 |
| Phenidone | 1 |
| Sodium carbonate monohydrate | 50 |
| Potassium bromide | 5 |
| Benzotriazole | 1 |
| 6-nitrobenzimidazole | 1 | pH raised to 12.0 with 20% NaOH.
Water to—1 liter.

During development a negative silver image was formed and the tetrazolium salt precursor reacted with excess developer to be reduced to its corresponding magenta-colored formazan dye uniformly throughout the emulsion layer.

Step 2.—Fixing of the undeveloped silver halide in a Kodak F-5 fixing bath for 1 minute at a temperature of 68° F.

Step 3.—Washing for 1 minute in running water at a temperature of 68° F.

Step 4.—Bleaching for 30 seconds at a temperature of 125° F. in a bath of the following composition:

Hydrochloric acid—100 ml.
Thiourea—125 g.
2-hydroxy-3-aminophenazine—500 mg.
Water to—1 liter.

In the bleach bath the dye was rendered colorless in proportion to the amount of previously imagewise developed silver.

Step 5.—Washing for 2 minutes in running water at a temperature of 68° F.

Step 6.—Drying of the sample in forced warm air.

An excellent positive magenta-color reproduction of the photographed test pattern was obtained.

Similar results were obtained with the colorless dye precursor Compound 19. The spectrophotometric curve of the formazan dye generated from this precursor showed an absorption maximum at 548 m$\mu$.

Example 2

A photographic element was prepared and processed essentially as described in Example 1, except that the silver halide emulsion was blue-sensitive and that the magenta dye precursor of Example 1 was replaced by an equimolar quantity of the precursor Compound 24. With this preparation an excellent positive yellow-colored dye image of the photographed test pattern was obtained. The spectrophotometric curve of the formazan dye generated from this precursor showed an absorption maximum at 433 m$\mu$.

Example 3

A photographic element was prepared and processed essentially as described in Example 1, except that the silver halide emulsion was panchromatically sensitized and that the magenta dye precursor used in Example 1 was replaced by an equimolar quantity of the precursor Compound 20. With this preparation an excellent positive cyan-colored dye image of the photographed test pattern was obtained. The spectrophotometric curve of the formazan dye generated from this precursor showed an absorption maximum at 725 m$\mu$.

Example 4

Three hundred twenty mg. of the magenta-colored formazan of Compound 26 were dissolved in 30 ml. of water and added, with stirring and at a temperature of 40° C., to 40 ml. of an orthochromatically sensitized silver chlorobromoiodide emulsion containing 108 g. of silver and 600 g. of gelatin per 4.0 kg. of the emulsion. The preparation was coated on a photographic paper support at the coverages of 80 mg./ft.$^2$ of silver; 500 mg./ft.$^2$ of gelatin; and 26.7 mg./ft.$^2$ of Compound 26. After drying, a sample of the coating was exposed and processed as described in Example 1. An excellent positive magenta-colored reproduction of the test pattern was obtained. The spectrophotometric curve of the formazan dye showed an absorption maximum at 562 m$\mu$.

Example 5

The procedure described in Example 4 was repeated, except that the emulsion was sensitive to blue light only and that the dye used was the yellow-colored formazan dye of Compound 25. An excellent yellow-dyed positive reproduction was obtained. The spectrophotometric curve of the formazan dye showed an absorption maximum at 434 m$\mu$.

Example 6

(a) The procedure described in Example 4 was repeated, except that the emulsion was panchromatically sensitized and that the dye used was the cyan-colored formazan dye of Compound 20. An excellent cyan-dyed positive reproduction was obtained. The spectrophotometric curve of this image dye showed an absorption maximum at about 650 m$\mu$.

(b) The procedure under (a) above was repeated with the use of the cyan formazan dye of Compound 22. The result obtained was similar to that described above. The spectrophotometric curve of this image dye showed an absorption maximum at about 625 m$\mu$.

Example 7

A multilayer photographic element of the following composition and structure was prepared on a polyethylene terephthalate film support:

LAYER A

| | Mg./ft.$^2$ |
|---|---|
| Gelatin | 100 |

LAYER B

Blue-sensitive silver bromoiodide emulsion:

| | |
|---|---|
| Silver | 81 |
| Gelatin | 242 |
| Mordant [1] | 200 |
| Bleach catalyst [2] | 10 |
| Yellow dye [4] | 70 |

LAYER C

| | |
|---|---|
| Gelatin | 80 |
| 2,5-dioctylbenzoquinone [3] | 40 |

LAYER D

Green-sensitive silver bromoiodide emulsion:

| | |
|---|---|
| Silver | 135 |
| Gelatin | 226 |
| Mordant [1] | 152 |
| Bleach catalyst [2] | 20 |
| Magenta dye [5] | 62 |

LAYER E

| | |
|---|---|
| Gelatin | 80 |
| 2,5-dioctylbenzoquinone [3] | 40 |

LAYER F

Red-sensitive silver bromoiodide emulsion:

| | |
|---|---|
| Silver | 250 |
| Gelatin | 311 |
| Mordant [1] | 170 |
| Bleach catalyst [2] | 40 |
| Cyan dye [6] | 59 |

LAYER G

| | |
|---|---|
| Gelatin | 100 |

/ / / / / / / Support / / / / / / /

[1] Mordant: Poly-α-methylallyl-N-guanidyl ketimine glycolate (U.S. Patent 2,882,156 issued Apr. 14, 1959).
[2] Bleach catalyst: 6,7 - dimethyl-2,3-dipyridylquinoxaline (Wilson's copending application U.S. Ser. No. 481,082, filed Aug. 19, 1965).
[3] Scavengers for migrating bleach catalysts (Wilson's copending application U.S. Ser. No. 481,082, filed Aug. 19, 1965).
[4] Yellow formazan dye of Compound 25.
[5] Magenta formazan dye of Compound 19.
[6] Cyan formazan dye of Compound 20.

A sample of the above described element was exposed through a neutral density intensity scale test object being superposed in contact with adjacently positioned strips of a blue, green and red filter. After exposure, the sample was processed according to the procedure described below.

*Step 1.*—Development for 1.5 minutes at a temperature 76° F. in Kodak D-72 Developer modified with 2.0 g. of potassium thiocyanate and 10.0 ml. of 0.5% 5-methylbenzotriazole in water.

*Step 2.*—Rinse for 30 seconds in water at a temperature of 68° F.

*Step 3.*—Fix for 1 minute in Kodak F-5 fixing solution at a temperature of 68° F.

*Step 4.*—Rinse for 45 seconds in water at a temperature of 68° F.

*Step 5.*—Dye-bleach for 35 seconds at a temperature of 75° F. in the following bath:

Concentrated hydrochloric acid—100 ml.
2-hydroxy-3-aminophenazine [1]—150 mg.
Thiourea—100 g.
Water to a total of 1 liter.

[1] The 2-hydroxy-3-aminophenazine was dissolved separately in a mixture of 15 ml. H$_2$O and 15 ml. glacial acetic acid, and the resulting solution was then added to the above composition of thiourea, hydrochloric acid and water.

The 2-hydroxy-3-aminophenazine was dissolved separately in a mixture of 15 ml. H$_2$O and 15 ml. glacial acetic acid, and the resulting solution was then added to the above composition of thiourea, hydrochloric acid and water.

*Step 6.*—Rinse with water for 30 seconds at a temperature of 68° F.

*Step 7.*—Silver-bleach for 1 minute ot a temperature of 82° F. in the following bath:

CuCl$_2$·H$_2$O—100 g.
Concentrated hydrochloric acid—25 ml.
Water to make 1 liter.

*Step 8.*—Rinse with water for 30 seconds at a temperature of 68° F.

*Step 9.*—Fix in Kodak F-5 fixing solution at a temperature of 68° F. for 1 minute.

*Step 10.*—Water wash for 3 minutes at 68° F. and dry.

A three-color positive reproduction of the test object was obtained wherein the exposure through the blue filter had produced a yellow dye image in the upper, i.e., blue-sensitive, emulsion layer, and the exposures through the green and red filters, a magenta and cyan dye image in the green-and red-sensitive emulsion layers, respectively.

The contrast, speed, and maximum dye densities of the magenta and cyan images produced in the intially green-and red-sensitive emulsion layer were lower than the contrast, speed, and maximum dye density in the initially blue-sensitive layer, the cyan-colored image having the lowest values.

Example 8

The procedures described in the foregoing Example 7 were repated except that in the photographic element prepared here the yellow dye and the mordant were contained in the interlayer (C) instead of in the emulsion layer (B), and the magenta dye and the mordant in interlayer (E) instead of in the emulsion layer (D).

A comparison of the sensitometric results obtained by this procedure with those obtained with the procedure described in Example 7 indicated a slight speed, contrast and density increase in the images recorded in the initially blue- and green-sensitive emulsion layers. However, these increases were only obtained at the expense of a decreased sharpness of the images recorded in these two layers.

Example 9

The procedure described in Example 7 was repeated with a photographic element similar to that shown in Example 7 except that the dyes were incorporated in the silver halide emulsion layers in the form of their colorless tetrazolium salt percursors. Accordingly, the preformed dyes in Layers B, D, and F of the film of Example 7 were replaced by their respective colorless precursors. Thus, Layer B contained the yellow percursor Compound 25; Layer D the magenta precursor Compound 19; and Layer F, the cyan percursor Compound 20. In addition, the photographic element of this example contained in the interlayer (C) a dispersion of colloidal silver (Carey Lea silver) at a concentration of 20 mg./ft.$^2$.

An evaluation of the sensitometric measurements taken of this processed sample indicated:

(1) Essentialy equal contrasts, maximum dye densities and effective speeds of each of the three separate dye images.

(2) Higher contrasts, maximum dye densities, sharpness and effective speeds of the magenta- and cyan-colored dye images as compared with the corresponding values exhibited by these two images in the processed samples described in Examples 7 and 8.

Example 10

The procedure described in Example 7 was repeated except for the following change in the incorporation of the formazan dyes: The yellow dye of Compound 25 was retained in Layer B; the magenta dye of Compound 19 was replaced by its colorless tetrazolium salt precursor; and the cyan dye of Compound 20 and the mordant were contained in Layer G instead of in Layer F.

The results obtained with this processed sample were essentially like those obtained with the sample described in Example 9 except that the cyan-colored image recorded in Layer G had a slightly lower contrast, $D_{max.}$, speed and sharpness.

Example 11

A single layer silver chlorobromide (2 mole-percent chloride, 98 mole-percent bromide) emulsion having the following composition was coated on a cellulose acetate support.

|  | Mg./ft.$^2$ |
|---|---|
| Silver | 100 |
| Gelatin | 400 |
| Mordant $^2$ | 24 |
| Tetrazolium salt $^1$ | 25 |

$^1$ 2,5 - diphenyl-3-(4,5-dimethyl-2-thiazolyl)tetrazolium bromide (Cpd. 21).

$^2$
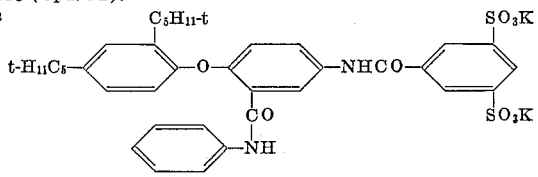

This compound is used to mordant the tetrazolium salt in the photo element.

The coating was divided into three strips, two of which were exposed and processed as follows. The temperature of all solutions was 75° F.
Developer (formula below)—10 sec.
Blix bath (formula below)—10 sec.
Chelating bath (formula below)—30 sec.
Water wash—30 sec.
Fixing bath (Kodak F–5)—30 sec.
Water wash—60 sec.
Dry.

DEVELOPER FORMULA

Hydroquinone—10 g.
Phenidone—5 g.
Ascorbic acid—50 g.
Aminoethanol—25 ml.
Potassium bromide—2 g.
5-Methylbenzotriazole (0.5% soln.)—25 ml.
Water to 1 liter.
pH adjusted to 12 (using 40% sodium hydroxide solution).

BLIX BATH

Thiourea—100 g.
Concentrated hydrochloric acid—100 ml.
Hydroxyaminophenazine—150 mg.
Sodium-m-nitrobenzenesulfonate—5 g.
Water to 1 liter.

CHELATING BATH

5% aqueous solutions of $Ni(SCN)_2$ and $(CH_3COO)_2Cd$ were used to form the metal chelates of the dyes in the two strips, respectively.

In each of the two strips, the nearly colorless tetrazolium salt was converted, in the developer bath, to the magenta-colored formazan dye 1,3-diphenyl-5-(4,5-dimethyl-2-thiazolyl)formazan. This formazan dye was bleached, in the blix bath, in proportion to the amount of metallic silver present in the coating (i.e., in proportion to exposure). The third strip (the control) was identically exposed and processed but not treated in a chelating bath.

Each of the three processed strips was then further divided into three separate strips, two of each of which were exposed to a xenon arc light for 24 hours and 48 hours, respectively. Spectrophotometric curves of the $D_{max.}$ area of each of the nine strips were made. The results are given in the following table:

|  | None | | 24 Hours | | | 48 Hours | | |
|---|---|---|---|---|---|---|---|---|
|  | $\lambda_{max.}$ | $D_{max.}$ | $\lambda_{max.}$ | $D_{max.}$ | Percent fade | $\lambda_{max.}$ | $D_{max.}$ | Percent fade |
| Strip A (control) unchelated | 640 | 1.72 | 640 | 1.08 | 37 | 640 | 0.6 | 65 |
| Strip B Ni(SCN)$_2$ chelated | 656 | 1.74 | 656 | 1.72 | 1.15 | 656 | 1.72 | 1.15 |
| Strip C (CH$_3$COO)$_2$Cd chelated | 650 | 2.70 | 650 | 2.60 | 3.7 | 650 | 2.5 | 7.4 |

These results show (1) the desirable bathochromic shift in absorption that took place when the formazan image dyes in the processed strips B and C were chelated with solutions of a nickel and a cadmium salt, respectively; and (2) the considerable improvement in light stability of the chelated image dye as against the unchelated form.

Example 12

Similar results were obtained when the procedure described in Example 11 was repeated with tetrazolium salts 2, 15, 19, and 21 and a number of other chelating

|  |  | Chelating Metal Salt Used | | | | |
|---|---|---|---|---|---|---|
|  | Compound used | None (control) $\lambda_{max.}$ (m$\mu$) | Nickelous thiocyanate, Ni(SCN)$_2$ $\lambda_{max.}$ (m$\mu$) | Cuprous Nitrate, Cu$_2$(NO$_3$)$_2$ $\lambda_{max.}$ (m$\mu$) | Cobalt acetate, (CH$_3$COO)$_2$Co $\lambda_{max.}$ (m$\mu$) | Cadmium acetate, (CH$_3$COO)$_2$Cd $\lambda_{max.}$ (m$\mu$) |
| Coating No.: |  |  |  |  |  |  |
| 1 | 21 | 562 | 656 |  |  |  |
| 2 | 15 | 502 | 570 | 600 | 542 | 610 |
| 3 | 19 | 550 | 620 | 660 | 564 | 645 |
| 4 | 2 | 498 | 650 | 642 | 600 | 655 | agents. The $\lambda_{max.}$ of unchelated and chelated dyes are contained in the preceding table.

Spectrophotometric curves were run on samples of the above mentioned coatings (i.e., in the $D_{max.}$ area) before and after 48-hour xenon arc fade with a 2B filter. The following table gives the percent of fade of the dyes in each of the tests (i.e., with each of the coatings and respective metal salts).

| | Compound used | None (control) percent fade | Nickelous thiocyanate, Ni(SCN)$_2$ percent fade | Cuprous nitrate, Cu$_2$(NO$_3$)$_2$ percent fade | Cobalt acetate, (CH$_3$COO)$_2$Co percent fade | Cadmium acetate, (CH$_3$COO)$_2$Cd percent fade |
|---|---|---|---|---|---|---|
| Coating No.: | | | | | | |
| 1 | | 21 | 75 | 2 | | 5.5 |
| 2 | | 15 | 2.8 | 2.4 | 2.6 | |
| 3 | | 19 | 58.2 | 6.4 | | |
| 4 | | 2 | 31.6 | 8.5 | 1.2 | 13.0 | 7.0 |

Example 13

This example illustrates suitable pairs of formazan dyes each of which pair is chelatable by the same metal compound to provide a stable magenta image in the green-sensitive, and a stable cyan image in the red-sensitive emulsion layer.

Nine multilayer coatings were prepared on a transparent film support. In each coating the blue-sensitive silver halide emulsion layer contained the azo dye Solantine Yellow RL, whereas the green- and red-sensitive silver halide emulsion layers contained the respective magenta- and cyan-image forming dyes in the form of their colorless tetrazolium salt precursors. The precursors were incorporated in the gelatinous silver halide layers either together with a mordant or as a dispersion in a suitable solvent such as di-n-butylphthalate or 2,4-di-t-amylphenol, or they were incorporated from aqueous solution in those cases where the precursor molecules were sufficiently ballasted to be prevented from migration and sufficiently soluble by the presence in the molecule of at least one solubilizing group.

The basic composition of each of the nine coatings is indicated below.

LAYER A

Mg./ft.$^2$
Clear gelatin overcoat _____ 100

LAYER B

Mg./ft.$^2$
Blue-sensitive silver halide emulsion:
   Silver _____ 80
   Gelatin _____ 240
   Yellow dye (Solantine Yellow RL) _____ 80

LAYER C

Gelatin interlayer:
   Gelatin _____ 88
   2,5-dioctylbenzoquinone _____ 40

LAYER D

Green-sensitive silver halide layer:
   Silver _____ 154
   Gelatin _____ 300
   Dye precursor _____ 70

LAYER E

Gelatin interlayer:
   Gelatin _____ 88
   2,5-dioctylbenzoquinone _____ 40

LAYER F

Red-sensitive silver halide layer:
   Silver _____ 230
   Gelatin _____ 410
   Dye precursor _____ 70

/ / / / / / / Support / / / / / / /

The coatings were exposed and processed according to the procedure outlined in Example 11.

In Table X are shown the specific magenta- and cyan-dye producing tetrazolium salt precursors used in each of the nine coatings, their colors after black-and-white development and after chelation, and the metals used for chelating each pair of dyes.

TABLE X

| Coating No. | Tetrazolium salt in layer | Color and $\lambda_{max.}$ after black-and white development | Color and $\lambda_{max.}$ after chelation | Chelating Metal |
|---|---|---|---|---|
| 1 | D compound, 24 | Yellow, 431 | Magenta, 515 | Zinc. |
|   | F compound, 18 | Yellow, 499 | Cyan, 623 | Do. |
| 2 | D compound, 25 | Light orange, 431 | Magenta, 541 | Copper. |
|   | F compound, 18 | Yellow, 499 | Cyan, 639 | Do. |
| 3 | D compound, 24 | Yellow, 431 | Magenta, 515 | Zinc. |
|   | F compound, 23 | Magenta, 525 | Cyan, 642 | Do. |
| 4 | D compound, 24 | Yellow, 431 | Magenta, 515 | Do. |
|   | F compound, 28 | Magenta, 496 | Cyan, 642 | Do. |
| 5 | D compound, 24 | Yellow, 431 | Magenta, 515 | Do. |
|   | F compound, 19 | Light tan, 551 | Cyan, 653 | Do. |
| 6 | D compound, 15 | Reddish orange, 502 | Magenta, 542 | Cobalt. |
|   | F compound, 28 | Magenta, 496 | Cyan, 676 | Do. |
| 7 | D compound, 28 | Pink-tan, 496 | Magenta, 676 | Cadmium. |
|   | F compound, 26 | Pink-tan, 562 | Cyan, 654 | Do. |
| 8 | D compound, 28 | Pink-tan, 496 | Magenta, 676 | Do. |
|   | F compound, 19 | Pink-tan, 551 | Cyan, 673 | Do. |
| 9 | D compound, 23 | Pink-tan, 525 | Magenta, 536 | Do. |
|   | F compound, 30 | Yellow-tan, 496 | Cyan, 517 | Do. |

The invention has been described in detail with particular reference to preferred embodiments thereof, but, it will be understood that variations and modifications can be effected within the spirit and scope of the invention described hereinabove and in the appended claims.

We claim:

1. A process for producing color images in an exposed photographic element including a support having coated thereon a hydrophilic coating containing light sensitive silver halide, and having in association therewith a compound selected from the group consisting of formazan dye, a metal chelate of a formazan dye and a colorless formazan dye-former, which comprises:
 (a) contacting said element with silver halide developing agent to develop metallic silver image;
 (b) reducing any of said colorless formazan dye-former to formazan dye;
 (c) bleaching said element to destroy formazan dye imagewise in just the areas of said silver image; and,
 (d) removing said metallic silver and silver halide from said element,
whereby a formazan dye image is obtained which is the reverse of said metallic silver image.

2. A process for producing color images in an exposed photographic element including a support having coated thereon a hydrophilic coating containing light sensitive silver halide, and having in association therewith a colorless tetrazolium salt which comprises:
 (a) contacting said element with silver halide developing agent to develop metallic silver;
 (b) reducing said tetrazolium salt to formazan dye;
 (c) bleaching said element to destroy formazan dye imagewise in just the areas of said silver image; and,
 (d) removing said metallic silver and silver halide from said element,
whereby a formazan dye image is obtained which is the reverse of said metallic silver image.

3. The process for producing colored images as defined in claim 2 wherein, subsequent to step (b), the formazan dye in said element is chelated.

4. The process for producing colored images in accordance with claim 2 wherein said tetrazolium salt has the following general formula:

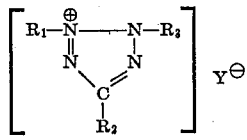

wherein $R_1$ and $R_3$ each represents a substituent selected from the class consisting of an aryl group and a heterocyclic group; $R_2$ represents a substituent selected from the group consisting of hydrogen, an alkyl group, an aryl group, a heterocyclic group, hydroxyl, carboxyl, sulfonyl, mercapto, and nitro; and, Y represents an anion.

5. The process for forming color images in an exposed photographic element including a support having coated thereon a gelatin layer containing exposed silver halide and a tetrazolium salt having the following formula:

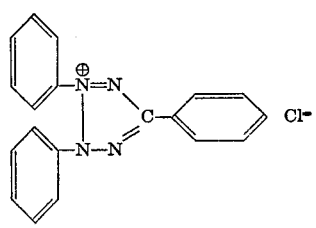

which comprises developing said silver halide to form a metallic silver image and reduce said tetrazolium salt to its corresponding magenta formazan dye uniformly throughout the gelatin layer; bleaching said element to render said formazan dye colorless in areas of said metallic silver image; and, removing the metallic silver image and the unexposed residual silver halide.

6. A photographic silver dye-bleach process wherein formazan dye is uniformly generated in a photographic element containing an exposed light sensitive silver halide emulsion layer having in association therewith colorless tetrazolium salt, a metallic silver image is developed in said layer; and, said formazan dye is bleached imagewise in just the areas of said metallic silver.

7. The process for forming color images in accordance with claim 6 wherein said formazan dye is chelated after said bleaching step.

8. A process for producing multicolor images in an exposed photographic element including a support having coated thereon at least three separate overlying hydrophilic colloid layers containing light sensitive silver halide, said layers being sensitive to red, green and blue radiation, said layers having in association therewith, respectively, formazan compound which provides cyan, magenta and yellow color, which comprises:
 (a) contacting said element with silver halide developing agent to develop metallic silver image in at least one of said layers;
 (b) reducing any colorless formazan to formazan dye;
 (c) bleaching said formazan dye in association with said silver image, said bleaching being imagewise in just the areas of metallic silver image; and,
 (d) removing said metallic silver and silver halide from said element,
whereby formazan dye image is obtained which is the reverse of said metallic silver image.

9. A process for producing multicolor images in an exposed photographic element including a support having coated thereon at least three separate overlying hydrophilic colloid layers containing light sensitive silver halide, said layers being sensitive to red, green and blue radiation, said layers having in association therewith, respectively, colorless tetrazolium salt which forms cyan, magenta and yellow color, which comprises:
 (a) contacting said element with silver halide developing agent to develop metallic silver image in at least one of said layers;
 (b) reducing said colorless tetrazolium salt in association with said silver image to formazan dye;
 (c) bleaching said element to destroy said formazan dye imagewise in just the areas of said silver image; and,
 (d) removing said metallic silver and silver halide from said element,
whereby formazan dye image is obtained which is the reverse of said metallic image.

10. The process for producing multicolor images in accordance with claim 8 wherein the formazan dye image in at least one layer is cheated.

11. The process for producing multicolor images in accordance with claim 9 wherein the formazan dye image in at least one layer is chelated.

12. The process for producing multicolor images in accordance with claim 9 wherein said tetrazolium salt in association with each of said blue, green and red sensitive silver halide emulsion layers forms, upon reduction and chelation, yellow, magenta and cyan chelated formozan dye, respectively.

13. The process for producing multicolor images in accordance with claim 8 wherein each of said blue, green and red light sensitive emulsion layers has in association therewith, respectively, yellow, magenta and cyan formazan dyes.

References Cited

UNITED STATES PATENTS

| | | | |
|---|---|---|---|
| 3,185,567 | 5/1965 | Rogers | 96—3 |
| 3,257,205 | 6/1966 | Cassiers et al. | 96—95 |
| 3,287,132 | 11/1966 | Hunt | 96—20 |

FOREIGN PATENTS 884,494  12/1961  Great Britain.

J. TRAVIS BROWN, Primary Examiner

U.S. Cl. X.R.

96—53, 99